(12) United States Patent
Schang

(10) Patent No.: US 10,819,253 B2
(45) Date of Patent: Oct. 27, 2020

(54) CONTROLLER AND METHOD FOR CONTROLLING A DRIVE MOTOR OF A PRODUCT CONVEYOR BELT AT A CHECKOUT

(71) Applicant: Interroll Holding AG, Sant' Antonino (CH)

(72) Inventor: Daniel Schang, Korschenbroich (DE)

(73) Assignee: INTERROLL HOLDING AG (CH)

( * ) Notice: Subject to any disclaimer, the term of this patent is extended or adjusted under 35 U.S.C. 154(b) by 86 days.

(21) Appl. No.: 16/307,036

(22) PCT Filed: Feb. 10, 2017

(86) PCT No.: PCT/EP2017/000186
§ 371 (c)(1),
(2) Date: Dec. 4, 2018

(87) PCT Pub. No.: WO2017/211434
PCT Pub. Date: Dec. 14, 2017

(65) Prior Publication Data
US 2019/0222149 A1    Jul. 18, 2019

(30) Foreign Application Priority Data
Jun. 7, 2016 (DE) .......... 10 2016 006 971

(51) Int. Cl.
*G06K 7/10* (2006.01)
*H02P 1/42* (2006.01)
(Continued)

(52) U.S. Cl.
CPC ............... *H02P 1/42* (2013.01); *B65G 23/00* (2013.01); *H02P 1/022* (2013.01); *H02P 1/04* (2013.01); *H02P 1/26* (2013.01)

(58) Field of Classification Search
CPC ... B65G 23/00; H02P 1/04; H02P 1/26; H02P 1/42
See application file for complete search history.

(56) References Cited

U.S. PATENT DOCUMENTS

| 6,684,376 | B1 | 1/2004 | Kerzman et al. |
| 2006/0049702 | A1 | 3/2006 | Hvidberg |

(Continued)

FOREIGN PATENT DOCUMENTS

| DE | 31 38 841 | 4/1983 |
| DE | 42 40 513 | 6/1993 |

(Continued)

OTHER PUBLICATIONS

German Office Action dated Mar. 8, 2017.
(Continued)

*Primary Examiner* — Muhammad S Islam
(74) *Attorney, Agent, or Firm* — Gerald E. Hespos; Michael J. Porco; Matthew T. Hespos

(57) ABSTRACT

A controller for a drive motor (60) of a product conveyor belt at a checkout has a phase-start cutting and/or phase-end cutting controller (50) that controls the drive motor (60) in such a manner that the product conveyor belt is accelerated with reduced torque from a non-driven state. A start controller controls the drive motor (60) in such a manner that the drive motor (60) initially drives with a non-reduced torque when accelerating the product conveyor belt from the non-driven state before the phase-start cutting and/or phase-end cutting controller (50) further accelerates the product conveyor belt with reduced torque.

20 Claims, 5 Drawing Sheets

(51) Int. Cl.
*H02P 1/26* (2006.01)
*H02P 1/04* (2006.01)
*B65G 23/00* (2006.01)
*H02P 1/02* (2006.01)

(56) References Cited

U.S. PATENT DOCUMENTS

| | | | |
|---|---|---|---|
| 2011/0050155 A1* | 3/2011 | Balcon | H02P 23/14 |
| | | | 318/778 |
| 2013/0320083 A1* | 12/2013 | Hammer | A47F 9/046 |
| | | | 235/383 |
| 2014/0116838 A1 | 5/2014 | Ribau | |
| 2015/0180377 A1* | 6/2015 | Hua | H02P 23/14 |
| | | | 318/778 |

FOREIGN PATENT DOCUMENTS

| | | |
|---|---|---|
| DE | 100 05 995 | 8/2001 |
| DE | 102 10 318 | 10/2003 |
| DE | 603 13 666 | 1/2008 |
| DE | 20 2011 004 513 | 7/2012 |
| EP | 1 037 375 | 9/2000 |

OTHER PUBLICATIONS

International Search Report dated Jun. 26, 2017.
Australian Examination Report dated Jul. 29, 2019.
Eaton—"Solid-state soft start motor controller and starter"—Application Paper AP03902001E, Feb. 2011.

\* cited by examiner

CONTROLLER AND METHOD FOR CONTROLLING A DRIVE MOTOR OF A PRODUCT CONVEYOR BELT AT A CHECKOUT

BACKGROUND

Field of the Invention

The invention relates to a controller and a method for controlling a drive motor of a product conveyor belt at a checkout.

Related Art

Product conveyor belts routinely are provided at checkouts and supermarkets and/or hardware stores on which customers can place products that are registered and paid for at the checkout. The product conveyor belts normally are driven by a drive motor that drives the product conveyor belts in a start/stop mode. In so doing, this can cause the product conveyor belt to start or stop jerkily and can cause the goods arranged on the product conveyor belt to wobble and/or tip over. It costs the user a great deal of time and corresponding wage costs to clean such a system after any products spill. Since the products at checkout counters in supermarkets are mass-produced, the cost of a solution to this problem is quite important.

To drive product conveyor belts, it is known to reduce initial torque of electric drive motors by means of cutting the phase at the beginning or, respectively, the end of the phase which cutting increases over time. In this regard, phase-cutting controllers are known and control the drive motor of the product conveyor belt such that the product conveyor belt is driven with initially reduced torque starting from a non-driven state. Consequently, drive motors can start gently much below full load.

Phase-cutting controllers cut sinusoidal input voltages in AC consumers at the beginning of the phase or at the end of the phase such that reduced energy is provided to the consumer. This allows product conveyor belts to start more slowly and should reduce tip-over of products located on the product conveyor belt. To gently start the drive motor, the start cutting or end cutting of the input voltage can be increased gradually until 100% of the torque, or respectively input shaft is reached.

Despite the use of a phase-cutting controller, loads located on the product conveyor belt can tip over, in particular when starting and braking the product conveyor belt.

The object of the invention is to improve the controlling of the drive motor of a product conveyor belt at a checkout to reduce tip-over of products on the product conveyor belt, and/or to reduce the costs of a controller.

SUMMARY

An initial element concerns a controller for a drive motor of a product conveyor belt at a checkout with a phase-start cutting and/or phase-end cutting controller that controls the drive motor in such a manner that the product conveyor belt is accelerated with reduced torque from a non-driven state. The controller moreover has a start controller that controls the drive motor in such a manner that the drive motor initially drives with a non-reduced torque when accelerating the product conveyor belt from the non-driven state before the phase-start cutting and/or phase-end cutting controller further accelerates the product conveyor belt with reduced torque.

This controller supplements and/or expands a controller of the drive motor when using the phase-start cutting and/or phase-end cutting controller. To the extent that acceleration of the product conveyor belt from the non-driven state is desired that for example can be indicated and/or initiated by means of a trigger, the start controller initially causes the product conveyor belt to be driven with non-reduced, i.e., full torque. This non-reduced torque can also be designated initial torque. In this case, driving with non-reduced torque means that the product conveyor belt is driven with at least approximately 95% of its TARGET torque. With the TARGET torque that can also be designated operating torque, the product conveyor belt is driven at a basically constant TARGET transport speed to the checkout when it transports products arranged on the product conveyor belt.

In particular, driving at a reduced torque can mean that the product conveyor belt is driven at a maximum drive motor torque. In so doing, the maximum drive motor torque can depend on the strength and/or power of an employed AC voltage source. The maximum torque can be greater than the operating torque.

Only shortly after the non-reduced torque, i.e., the initial torque, from the drive motor acts on the product conveyor belt by means of the starting controller, the phase-start cutting and/or phase-end cutting controller takes over the subsequent acceleration of the product conveyor belt. Short term driving with non-reduced torque i.e., with full torque, helps reduce and/or overcome initial inertia of the product conveyor belt. It was revealed that it is difficult to ensure gentle starting of the product conveyor belt by means of a preset phase-start cutting and/or phase-end cutting controller for an initially unknown load of products on the product conveyor belt. It can thus depend on the real ACTUAL load and the weight on the product conveyor belt as to whether the phase-start cutting and/or phase-end cutting controller can ensure sufficiently gentle starting. If initially supplied energy is insufficient to overcome a start-up current, the drive motor initially does not run correctly. The product conveyor belt starts to move only when the start-up current is overcome does, and this start of movement can lead to sudden and/or jerky accelerations that in turn can lead to the undesirable tipping-over of products on the product conveyor belt.

In order to circumvent this problem, weight sensors, for example, can be used which can determine the weight load on the product conveyor belt. Since product conveyor belts can be designed long, implementing such weight sensors can be comparatively expensive. In order to render the implementation of such weight sensors superfluous and thereby lower production costs, the use of such weight sensors and/or other sensors can be entirely omitted in the solution according to the invention.

Whereas the phase-start cutting must be individually modified for each individual load on the product conveyor belt with normal phase-start cutting and/or phase-end cutting with a linear torque ramp by modifying the initial phase angle of the phase-start cutting, such an individual control can be omitted in the context of the invention.

Another solution for overcoming the start-up current could be the use of frequency converters that for example influence the frequency of three individual phases of a drive motor. A gentle and stable startup of the product conveyor belt can also be ensured in this manner. However, the comparatively high costs are a disadvantage of this technique. Purely mechanical solutions such as spring damper systems are also expensive since for example springs would have to be adapted to the product conveyor belt depending on the load in order to enable smooth starting and stopping. When controlling according to the first element, frequency converters and/or such mechanical solutions can be omitted, which reduces the costs of controlling and hence of the checkout system.

With the above-described start controller of the controller according to the invention, the initial torque is increased upon starting the product conveyor belt. In so doing, initially, i.e., when starting the product conveyor belt, neither phase-start cutting nor phase-end cutting occurs for a certain time; instead, about 100% of the starting phase is fed to the drive motor. This means the same thing as the drive motor driving the product conveyor belt with non-reduced torque as the initial torque. The start controller can ensure that the product conveyor belt is driven with non-reduced torque as long as the drive motor is operated with start-up current. In particular, the start controller can cease at about the point in time of driving with non-reduced torque, at which operation begins with full load current. In so doing, the product conveyor belt is basically only driven with non-reduced torque until the product conveyor belt is not running at a relevant speed, i.e., is in its startup phase. Driving with non-reduced torque can already end before the product conveyor belt has reached about 20% of its basically constant TARGET transport speed, in particular before it has reached about 10% of its constant TARGET transport speed.

Once the full load current is reached, controlling with the phase-start cutting and/or phase-end cutting controller can occur as usual, i.e., with the actual ramp for starting the product conveyor belt. At this point in time, the non-reduced applied torque can be reduced and/or scaled back abruptly, suddenly, in steps and/or steeply to a ramp starting torque. The ramp starting torque is the reduced torque at which the phase-start cutting and/or phase-end cutting controller start acceleration. Accordingly, the phase-start cutting and/or phase-end cutting controller assumes control of actual acceleration of the product conveyor belt at its basically constant TARGET transport speed after the start controller has achieved overcoming and/or reducing the inertia and/or the start-up current.

The controller can accordingly be designed at least in two parts and have both the phase-start cutting and/or phase-end cutting controller as well as the starting controller.

The drive motor can be an electrical drive motor, in particular a single-phase electric motor. The drive motor can have known electrical behavior. By knowing the electrical behavior of the drive motor, additional sensors such as weight sensors and/or sensors for motor current can be omitted. In particular, the drive motor can be designed as a drum motor. A drum motor is particularly suitable for driving a product conveyor belt since the drum motor is compact and space-saving, and can be configured for a product conveyor belt instead of a deflection roller or a drive roller, e.g. driven by external means. The controller can accordingly be configured to control a drum motor.

The product conveyor belt can be a conventional conveyor belt at a standard checkout. The product conveyor belt is configured for placing products on the product conveyor belt and to transport the products arranged on the product conveyor belt to the checkout. The checkout can for example be a supermarket checkout and/or a hardware store checkout.

Phase-start cutting and/or phase-end cutting controllers are known in principle to a person skilled in the art. For example, such a phase-start cutting and/or phase-end cutting controller is described in greater detail in the document DE 10 2013 209 696 A1. In conjunction with the phase-start cutting and/or phase-end cutting controller, reference is made to the subject matter disclosed in this document.

The phase-start cutting and/or phase-end cutting controller controls the drive motor such that it initially accelerates the product conveyor belt with a reduced torque, i.e., the ramp starting torque. In so doing, the ramp starting torque can for example be about 20% to about 50% of the full operating torque. The phase-start cutting and/or phase-end cutting controller can increase the applied torque, at least on average, gradually and/or linearly from the reduced starting torque up to the full, i.e., reduced operating torque that corresponds to the basically constant transport torque. This causes gentle starting of the product conveyor belt. Once the full operating torque is reached, the product conveyor belt is driven further by the drive motor at a constant speed and constant torque until for example the products arrive at a target point next to the checkout, and the product conveyor belt can again be stopped.

The controller makes it possible to start the drive motor gently and accordingly the product conveyor belt driven by the drive motor without reducing the torque too strongly when starting the product conveyor belt. The controller is suitable for driving product conveyor belts with different loads, in particular both for driving unloaded product conveyor belts as well as for driving fully loaded product conveyor belts. Especially with product conveyor belts that are fully loaded or nearly under a full load, the controller reduces the initial inertia so significantly that gentle starting of the product conveyor belt is enabled. Such strongly laden product conveyor belts regularly move jerkily when they are only controlled by a conventional phase-start cutting and/or phase-end cutting controller. The controller according to the invention can overcome this problem and accordingly reduce the hazard of products tipping over especially with product conveyor belts that are loaded strongly, fully or nearly under a full load.

According to one embodiment, the start controller is configured such that the drive motor drives the product conveyor belt with non-reduced torque, i.e., initial torque, for a set time period before the phase-start cutting and/or phase-end cutting controller further accelerates the product conveyor belt with reduced torque, i.e., the ramp starting torque. In this embodiment, a fixed time period is specified for which the start controller drives the product conveyor belt with the full initial torque. This set time period can also be termed the initial time period. Sensors can thereby be omitted that establish the precise progression of the start-up current and/or the full load current. In this context, the set time period can be configured to be sufficiently short and/or selected to at least initially prevent controlling with non-reduced torque with a drive motor running at a relevant speed. The set time period, i.e., the initial time period, can even be variably adjustable in one embodiment in order, for example, to react to a load on the product conveyor that is both stronger or weaker on average.

In a development of this embodiment, the specified time period, i.e., the initial time period, can be from about 50 ms to about 500 ms. In particular, the specified time period can be from about 100 ms to about 300 ms. Such a short time period is normally insufficient to accelerate the product conveyor belt to a relevant speed. However when starting up the product conveyor belt, this short time period is insufficient to overcome initial inertia and/or to reduce it sufficiently so that the phase-start cutting and/or phase-end cutting controller can gently accelerate further up to a basically constant operating speed and/or TARGET transport speed.

According to one embodiment, the start controller is configured such that the product conveyor belt is driven with the non-reduced torque until a full load current is reached when driving the product conveyor belt. In this embodiment, the load current can, for example, be measured and/or monitored by the drive motor. If it is found that the drive motor has overcome the start-up current, and/or has reached the full load current, the non-reduced torque is scaled-back abruptly, suddenly, in steps and/or steeply and reduced to the reduced torque with which the ramp of the phase-start cutting controller and/or phase-end cutting controller commences acceleration. This embodiment yields a particularly efficient and optimized control of the acceleration process since the start controller applies the full torque to the product conveyor belt precisely as long as necessary to overcome the start-up current. Consequently, the controller is particularly efficient in gently starting up the product conveyor belt.

According to one embodiment, the phase-start cutting and/or phase-end cutting controller increases the torque of the drive motor basically continuously and/or linearly up to the full torque, i.e., the operating torque when accelerating the product conveyor belt. After the start controller initially applies the full torque for a short period, the phase-start cutting and/or phase-end cutting controller assumes the further acceleration of the product conveyor belt. In so doing, the phase-start cutting and/or phase-end cutting controller initially applies a specified first initial value of the torque, i.e., the ramp starting torque, that can contribute for example about 20% to about 50% of the full torque, i.e., the initial torque. The phase-start cutting and/or phase-end cutting controller increases the torque used to drive the product conveyor belt from this reduced initial value (the ramp starting torque) up to the full, i.e., non-reduced torque, i.e., the operating torque, over a specified rise time period. The extent of this rise time period and the level of the ramp starting torque determine the steepness of the ramp with which the phase-start cutting and/or phase-end cutting controller accelerates the product conveyor belt.

According to one embodiment, the phase-start cutting and/or phase-end cutting controller increases the drive motor torque basically beginning at a predetermined ramp starting torque that corresponds to about 10% to about 50% of the operating torque, especially gradually, up to the full operating torque when accelerating the product conveyor belt. In this case, the ramp is accordingly not started at a ramp starting torque of 0% of the operating torque, but rather immediately with a ramp starting torque different from zero. The ramp starting torque can be adjustable. Preferably, the ramp starting torque is about 20% to about 40% of the operating torque, in particular about 30% of the operating torque. Greater loads can thus be transported more reliably.

According to one embodiment, the start controller is configured such that after a stoppage of the product conveyor belt, a dead time of a predetermined duration is provided, after the expiration of which the product conveyor belt is re-accelerated as soon as possible. In other words, a restart of the product conveyor belt is prevented and/or delayed by at least the dead time. This can reduce the shaking of transported goods on the product conveyor belt since objects with a center of gravity that is located higher can wobble and tip over at the following start by an otherwise uncontrolled start/stop mode. The dead time serves to reduce/eliminate oscillation of the center of gravity. The dead time can for example be about 500 ms to about 2000 ms, preferably about 750 ms to about 1250 ms, particularly preferably about 1000 ms.

According to one embodiment, the phase-start cutting and/or phase-end cutting controller continues to control the drive motor such that the product conveyor belt is braked from a driven state with an initially reduced torque before the drive motor stops driving the product conveyor belt. Then the product conveyor belt accordingly stands still. In this embodiment, the phase-start cutting and/or phase-end cutting controller not only yields a gentle startup of the product conveyor belt, but also a gentle braking of the product conveyor belt from full torque—operating torque— up to a torque of zero. In so doing, a very gentle transition is created when starting the product conveyor belt as well as when braking the product conveyor belt which can prevent and/or reduce tip-over of products on the product conveyor belt. In so doing, another ramp slope can be used when braking than when starting up the product conveyor belt. In particular, the ramp slope can be configured less when braking than when starting up. This can be achieved in that a slope time period, during which the torque is reduced from the operating torque to zero, is longer than a rise time period during which the torque is increased for example from the ramp starting torque to the operating torque. By braking more slowly, the hazard of transported goods tipping over is reduced. In so doing, for example, a slope time period from the operating torque to a standstill of 500 ms to about 1000 ms can be predetermined, preferably about 700 ms.

In general, a rise time period, i.e., a ramp acceleration period of about 300 ms to about 700 ms can be predetermined, preferably about 500 ms.

According to one embodiment, a trigger is provided for initiating the acceleration of the product conveyor belt from the non-driven state, and/or to initiate a stoppage of the product conveyor belt from a driven state. The trigger can for example be configured as a light barrier that records whether or not products are arranged at a specific position on the product conveyor belt. Alternatively or in addition, a foot pedal can for example be provided as a trigger for starting up and/or braking the product conveyor belt, and can be operated by an operator working at the checkout. Once a start signal is initiated by the trigger to accelerate the product conveyor belt, the start controller begins by applying the full torque to the drive motor and accordingly to the product conveyor belt. After a short time, the phase-start cutting and/or phase-end cutting controller assumes the additional gentle acceleration of the product conveyor belt. Even when the product conveyor belt stops, the trigger can generate a corresponding stop signal that initiates the process of stopping the product conveyor belt, possibly with phase start cutting and/or phase end cutting.

A second element relates to a control unit for providing a controller according to the first element for a checkout system that has the product conveyor belt, the drive motor and the phase-start cutting and/or phase-end cutting controller. In this case, the control unit has a least the start controller and is configured as a separate component. Furthermore, the control unit is configured to be connected between the phase-start cutting and/or phase-end cutting controller on the one hand and the drive motor on the other hand. The control unit can be used as a separate component in order to retrofit existing checkout systems that already have a phase-start cutting and/or phase-end cutting controller with the control unit. The control unit supplements the existing checkout system with the start controller that is described above in conjunction with the first element. The control unit can for example be configured as a component that only has electrical connections, in particular a connection four the phase-start cutting and/or phase-end cutting controller, and another connection for the drive motor. The control unit can be configured compactly and can accordingly serve particularly well for retrofitting existing checkout systems.

In one development, the control unit has its own power connection that is configured separately from a power connection for the phase-start cutting and/or phase-end cutting controller. In this embodiment, the control unit has its own power connection and is accordingly independent from a power supply from the phase-start cutting and/or phase-end cutting controller available in the checkout system. This can improve and/or enable application of the non-reduced, full torque for initially starting up and/or accelerating the product conveyor belt.

In one embodiment, the control unit has its own internal phase-start cutting and/or phase-end cutting controller that further accelerates the product conveyor belt with reduced torque instead of the phase-start cutting and/or phase-end cutting controller of the checkout system after the start controller drives the product conveyor belt with initially non-reduced torque when accelerating the product conveyor belt from the non-driven state. The control unit accordingly has its own internal phase-start cutting and/or phase-end cutting controller as a second phase controller that assumes the actual gentle acceleration of the product conveyor belt. The first phase controller, i.e., the phase-start cutting and/or phase-end cutting controller of the checkout system, is redundant in this case and is actually not needed anymore and is instead replaced by the internal, second phase-start cutting and/or phase-end cutting controller. In this embodiment, the control unit can only receive signals coming from the first phase-start cutting and/or phase-end cutting controller of the checkout system such as a start signal and/or a stop signal that initiates when starting, starting up and/or braking the product conveyor belt must begin. In this case, signals for the control unit coming from the first phase-start cutting and/or phase-end cutting controller of the checkout system only serve as a trigger and/or initiator for starting and stopping the product conveyor belt. The acceleration process of the product conveyor belt itself is controlled by the start controller configured in the control unit and the internal, second phase-start cutting and/or phase-end cutting controller.

A third element relates to a control unit for providing a controller according to the first element for a checkout system that has the product conveyor belt and the drive motor as well as a trigger for initiating the acceleration of the product conveyor belt from the non-driven state, and/or to initiate a stoppage of the product conveyor belt from a driven state. In this case, the control unit is configured as a separate component that has the start controller and the phase-start cutting and/or phase-end cutting controller as an internal component, and is configured to be connected between the trigger on the one hand in the drive motor on the other hand. This control unit according to the third element is accordingly suitable for being installed between the trigger and the drive motor in order to supplement an existing checkout system with a controller according to the first element. In this case, the checkout system to be equipped, or respectively retrofitted does not even have to have its own phase-start cutting and/or phase-end cutting controller. The control unit has this namely as its own internal phase-start cutting and/or phase-end cutting controller that assumes the acceleration of the product conveyor belt after the start controller has initially briefly applied the full torque to the product conveyor belt.

In one embodiment of the control unit according to the second or third element, the control unit is connected to a plurality of drive motors of different product conveyor belts and is moreover configured to control this plurality of drive motors with the at least one starting controller. This control unit serves to control the product conveyor belts of a checkout system that has a plurality of product conveyor belts, such as at a single checkout and/or at a plurality of checkouts. In this case, the individual product conveyor belts can either be configured with the same design or a different design. Accordingly for example, just as high a number of product conveyor belts can be configured at a fixed number of checkouts. Likewise, a plurality of product conveyor belts can be provided at a single checkout, for example at least one for supplying goods, and at least one for removing goods. The control unit can also be used for checkout systems in which a plurality of product conveyor belts can transport products from different directions to the checkout, and/or away from the checkout. With such checkout systems, it can be additionally provided that the running direction of the individual product conveyor belt is for example individually adjusted and/or controlled by means of the control unit. The start controller at all or some of the product conveyor belts can initially apply the full torque during the acceleration process, at least for a short time period, before the phase-start cutting and/or phase-end cutting controller belonging to the respective product conveyor belt assumes the subsequent acceleration process. The control unit can accordingly be located between a plurality of drive motors and a plurality of phase-start cutting and/or phase-end cutting controllers assigned to the individual drive motors. The control unit can control some or all of the individual drive motors, either by means of a single starting controller, or a plurality of (e.g. parallel-connected) starting controllers can be provided in the control unit, of which one is configured to control a least one of the different drive motors. In particular, one start controller can be provided in the control unit per drive motor to be controlled.

With the embodiment of the control unit according to the second or third element, the control unit has an interface:
for undertaking software updates for the control unit;
for reading out parameters and/or data from the control unit; and/or
for establishing a connection to a module of the checkout system.

The interface can for example be configured as a USB, Bluetooth, Wi-Fi, NFC interface or the like. Software updates, for example, can be carried out by this interface. Alternatively or in addition, parameters and/or data can be read out via the interface from the control unit that for example are used to diagnose the control box and/or the control unit. Usage data and/or forecast data described below can be read out via the interface. The parameters and/or the data from the control unit can comprise data occurring and/or used while operating the control unit, in particular:
a number of performed start/stop cycles,
a duty cycle and/or
a recorded motor current.

In addition or alternatively to the interface, the control unit can have a bus. The interface and/or the bus can be used to communicate with surrounding peripherals such as the scanner, checkout system, checkout counter light, scale, and other control boxes. A mesh network can be assembled therewith.

With the embodiment of the control unit according to the second or third element, the control unit has a thermal switch for overload protection of the drive motor. In this case, inputs can be configured in the control box to which the thermal switches (such as thermocuts) of the drive motor(s) can be connected. When the drive motors overheat, the control box can assume a malfunction stop state. Manual acknowledgment can occur in this case. This can yield an improvement of the protection and durability of the drive motors.

With the embodiment of the control unit according to the second or third element, the control unit has a memory module for saving data from the control unit. The memory module can in particular be configured as a magnetic and/or optical data carrier. The parameters and/or the data from the control unit can comprise data occurring and/or used while operating the control unit, in particular:
- a number of performed start/stop cycles,
- a duty cycle and/or
- a recorded motor current.

In one development of this embodiment, the control unit has a forecasting module that is configured to derive and/or estimate a forecast characteristic value for a residual life of the drive motor from the saved data. The forecasting module can for example function by saving, and/or reading out, and/or evaluating the above-described parameters and/or data from the control unit which can be used as forecast data. In this case, the forecast data can be saved in a memory module. This forecast data can be compared with one or more limit values in order to generate a forecast signal depending on having exceeded this one or more limit value(s) from which a forecast characteristic value is derived. The forecast characteristic value can contain a probability of a failure and/or a defect of the belt drive in the near future. This can be used to preventatively exchange components suspected of pending malfunction that are identified by means of the forecast data before a failure, or respectively defect occurs.

In an additional or alternative development of the embodiment, the control unit has a usage profile module which is configured to derive and/or estimate a usage profile relating to the utilization of the checkout system from the saved data. The usage profile module can for example function by saving, and/or reading out, and/or evaluating the above-described parameters and/or data from the control unit which can be used as user data. In this case, the usage data can be saved in a memory module. In addition, the acquired user data can be output by the above-described interface, and/or used in the control box to create user statistics of the usage profile that can be output by the interface. These evaluation results and/or user statistics can for example be visually output on a display. The usage profile can be used to harmonize the modified new checkout system to the local capacity when expanding, and/or renewing, and/or modifying the checkout system.

The same data can at least partially be used as forecast data and user data.

The control unit can have a communication module. The communication module can be or become connected to the service unit by the above-described interface that alerts a service, orders a service, or initiates maintenance measures, in particular for preventative maintenance.

The control unit can be changed to a diagnostic mode. In diagnostic mode, depending on an estimated residual life of the drum motor, a peripheral connected directly and/or indirectly to the control unit (such as the connected checkout lights) can be used in order to display and/or visualize this estimated residual life for a set and/or predetermined time period (for example by green, yellow and red lights of the checkout counter lights). The residual life can for example be estimated by means of the above-described forecasting module.

In diagnosis mode, one are all adjacent control box(es) can be switched to diagnosis mode via the above-described interface in order to also display and visualize the estimated residual life by the peripheral on the neighboring control box(es).

A fourth element relates to a checkout system with a control according to the first element, the product conveyor belt and the drive motor. Since the checkout system has a controller according to the first element, all of the above statements made in this context also apply to the checkout system according to the fourth element.

In a development of the checkout system, the checkout system has a control unit according to the second or third element. The checkout system in this embodiment can accordingly be retrofitted with the control unit.

A fifth element relates to a method for controlling a drive motor of a product conveyor belt at a checkout, wherein when accelerating the product conveyor belt from a non-driven state, initially:
- the drive motor is controlled such that the drive motor drives the product conveyor belt with non-reduced torque before
- a phase-start cutting and/or phase-end cutting controller controls the drive motor such that the product conveyor belt is accelerated further with a reduced torque.

The method according to the fifth element can be performed with a controller according to the first element. Consequently, all of the above statements made in conjunction with the first element also apply to the method according to the fifth element and vice versa.

Instead of the term "phase-start cutting and/or phase-end cutting controller", the simplified term phase controller will also sometimes be used in the context of this invention.

The invention is explained in greater detail below with reference to exemplary embodiments shown in figures. Individual features shown in the figures can be combined with other embodiments.

DETAILED DESCRIPTION

Figure 1:
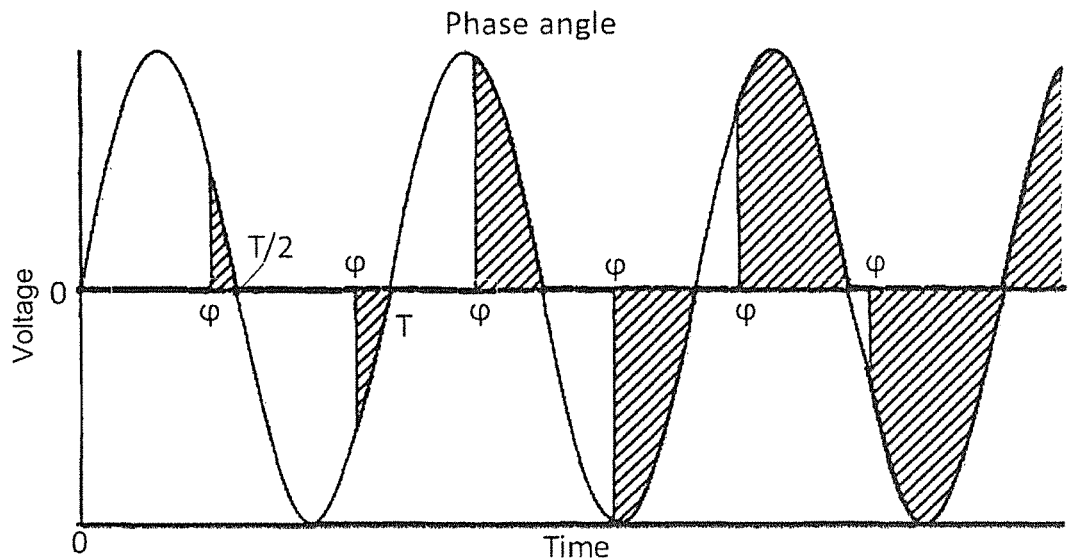
FIG. 1 shows a diagram of the operation of a phase-end cutting control.

FIG. 1 shows a diagram of the operation of a phase-end cutting controller. The diagram shows the voltage characteristic of an AC voltage that is approximately sinusoidal plotted over time. The voltage can for example be a typical AC voltage that is provided by for example a single-phase power grid. In order to effectuate a gentle startup of a product conveyor belt, a phase controller cuts a start-portion, or respectively end-portion, of the phase of the shown voltage to accelerate a product conveyor belt. The phase controller also hence actually applies the AC voltage to a drive motor of a product conveyor belt only for parts of the phases.

Given a period T, voltage could be applied to the drive motor from point in time 0 to point in time T/2 during a first sign wave of the AC voltage portrayed in the diagram that is shown directly adjacent to the zero point in time in the diagram. During this time period, the phase-end cutting controller "cuts" this voltage for the majority of the time between 0 and T/2 and only applies the voltage to the drive motor toward the end of the shown first sign wave.

In the shown diagram, the periods in which the phase-end cutting controller applies a voltage to the drive motor of, for example, a product conveyor belt is marked by a hatched area between the sinusoidal voltage and the zero axis of the voltage. If said area is unfilled, i.e., portrayed white, the phase-end cutting controller "cuts" the voltage, i.e., does not apply the voltage to the drive motor.

During the first, positive sinusoidal voltage arc (i.e., within the time period from 0 to T/2), the phase-end cutting controller only lets the voltage "through" during about the last 15% of the associated period of T/2. This percentage slowly increases the AC voltage from sign wave to sign wave until the phase-end cutting controller has applied the entire phase voltage to the drive motor in the sign wave portrayed on the far right that is the seventh sign wave in the diagram. In this case it should be noted that the number of sign waves (or actually half sign waves) is to be understood as an example. In reality, the phase-end cutting controller regularly lets the full voltage through only at a substantially later point in time.

In other words, the phase-end cutting controller applies the voltage to the drive motor only at certain phase angles cp. The phase-end cutting controller applies the voltage to the drive motor only beginning at a certain start phase angle φ up to the next zero crossing of the AC voltage. This start phase angle φ can for example change from zero crossing to zero crossing of the AC voltage so that the phase-end cutting controller always applies voltage to the drive motor earlier and earlier until the full voltage is applied to the drive motor. In general, a phase controller can be designed so that it applies voltage to the drive motor later and later during the acceleration period T of the AC voltage until it applies the full voltage.

The operation of a phase-start cutting controller is similar to that of a phase-end cutting controller. A difference between these two-phase controllers is that one cuts off the beginning of a sine wave, whereas the other cuts off the end of the sine wave. Otherwise, the two-phase controllers, i.e., the phase-start cutting controller and the phase-end cutting controller, have a similar effect. While the one phase controller applies voltage to the drive motor beginning at a start phase angle φ up to the zero crossing, the other only applies voltage from a zero crossing to an end phase angle. Since the principle of a phase-start cutting and/or phase-end cutting controller is well-known to a person skilled in the art, the operation of a phase-start cutting and phase-end cutting controller will not be addressed further at this juncture; instead, reference is made in this regard to the relevant professional literature.

Figure 2:
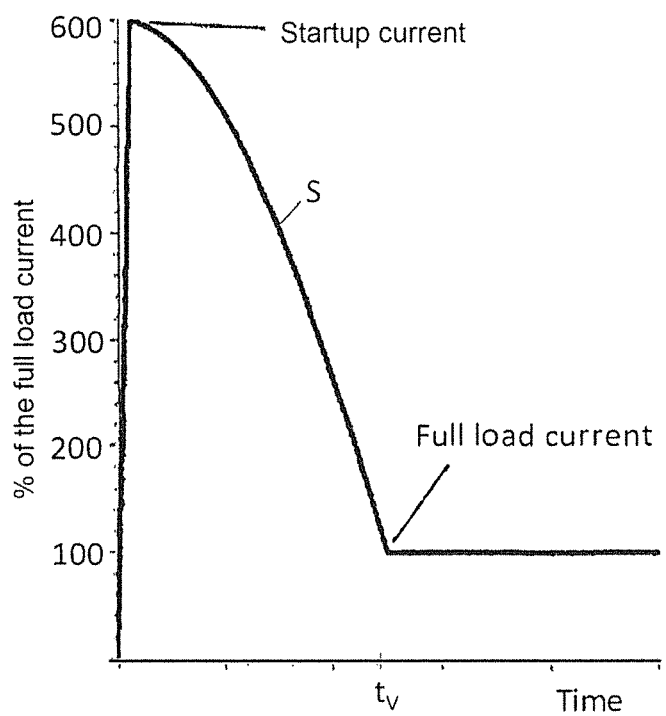
FIG. 2 shows a diagram of a typical current characteristic for a drive motor of a product conveyor belt.

FIG. 2 shows a diagram of a typical current characteristic S for a drive motor of a product conveyor belt over time. Starting at a certain point in time that is portrayed in the diagram as point in time $t_v$, the drive motor is driven under full load current. Before point in time $t_v$, initially a start-up current is to be applied that moves the drive motor and the product conveyor belt out of a non-driven state. In this non-driven state, the product conveyor belt is in a resting state in which it does not move.

In order for example to overcome the inertia of the product conveyor belt, initially the start-up current is to be applied that is configured to be many times greater than the full load current applied later. In the exemplary embodiment shown in FIG. 2, the start-up current is initially about six times as large as the full load current. Since the start-up current is regularly configured to be significantly greater than the full load current, starting a product conveyor belt by means of a drive motor that is controlled by a phase-start cutting or phase-end cutting controller can cause a jerky and sudden start of the product conveyor belt. This is because the slight torque applied to the drive motor during the first sign wave (see FIG. 1) cannot provide the high start-up current. This causes the product conveyor belt to initially not move before it starts with a jerk.

The phase-end cutting shown in FIG. 1 causes the torque with which the drive motor drives the product conveyor belt to be initially low and only increase over time. This increase can for example be gradual and/or substantially linear depending on the change in the phase-start cutting by the phase-start cutting, or respectively phase-end cutting controller. The initially very slight torque is insufficient in this case to provide the high start-up current as shown in FIG. 2.

Figure 3:
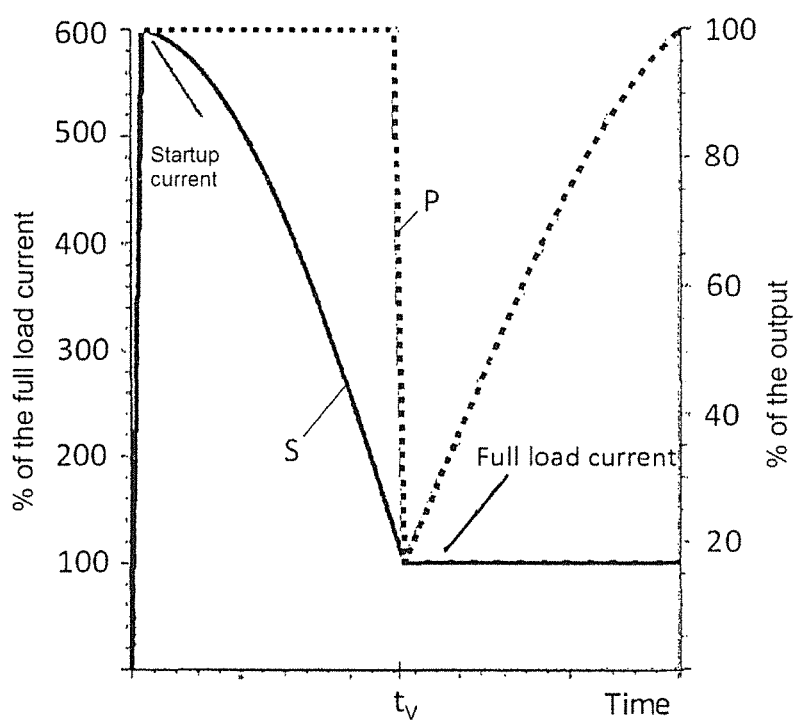
FIG. 3 shows a diagram of a typical current characteristic for a drive motor of a product conveyor belt together with a characteristic of power that is applied to the drive motor according to the invention.

FIG. 3 shows a diagram of a typical current characteristic S for a drive motor of a product conveyor belt together with a percentage of power that is applied to the drive motor according to the invention. The characteristic of the applied power is identified by P in FIG. 3. According to the invention, about 100% of the power P and accordingly about 100% of the torque can be applied, i.e., about 100% of the phase can be let through until the start-up current has been overcome. In the shown exemplary embodiment, the full torque is accordingly applied to the product conveyor belt from starting time t=0 until the point in time $t_v$ at which the full load current is reached. Only starting at point in time $t_v$ does the phase-start cutting and/or phase-end cutting controller assume increasing the torque under a full load current until about 100% of the power P, i.e., about 100% of the torque and about 100% of the phase are applied.

Theoretically, the characteristic shown in FIG. 3 of the applied power P and phase can be advantageous at which the full torque is applied to the drive motor up to precisely the point in time $t_v$, i.e., precisely until the full load current is reached. In practice, the full, i.e., non-reduced torque can also be applied for a preset time period instead before the phase-start cutting and/or phase-end cutting controller further controls the applied voltage. Consequently, the characteristic of the applied power, phase and torque can deviate in practice from the power characteristic P shown in FIG. 3. Accordingly, the step-like reduction in the torque and/or the beginning of the ramp of the phase-end cutting controller can occur at a point in time that deviates somewhat from the point in time $t_v$, i.e., at a preset period. When such a preset time period is used, sensors can be omitted that for example detect and/or monitor the motor current.

In the diagram portrayed in FIG. 3, the characteristic of the power P that is identified with a solid line and is indicated in percent corresponds with the opening angle of the phase-start cutting and/or phase-end cutting controller, and/or corresponds thereto. In this case, 100% of the power corresponds to the full, i.e., non-reduced torque that is applied to the product conveyor belt without reducing the phase of the drive motor. To stop the drive motor, a single simple, e.g., linear ramp can be used.

Figure 4:
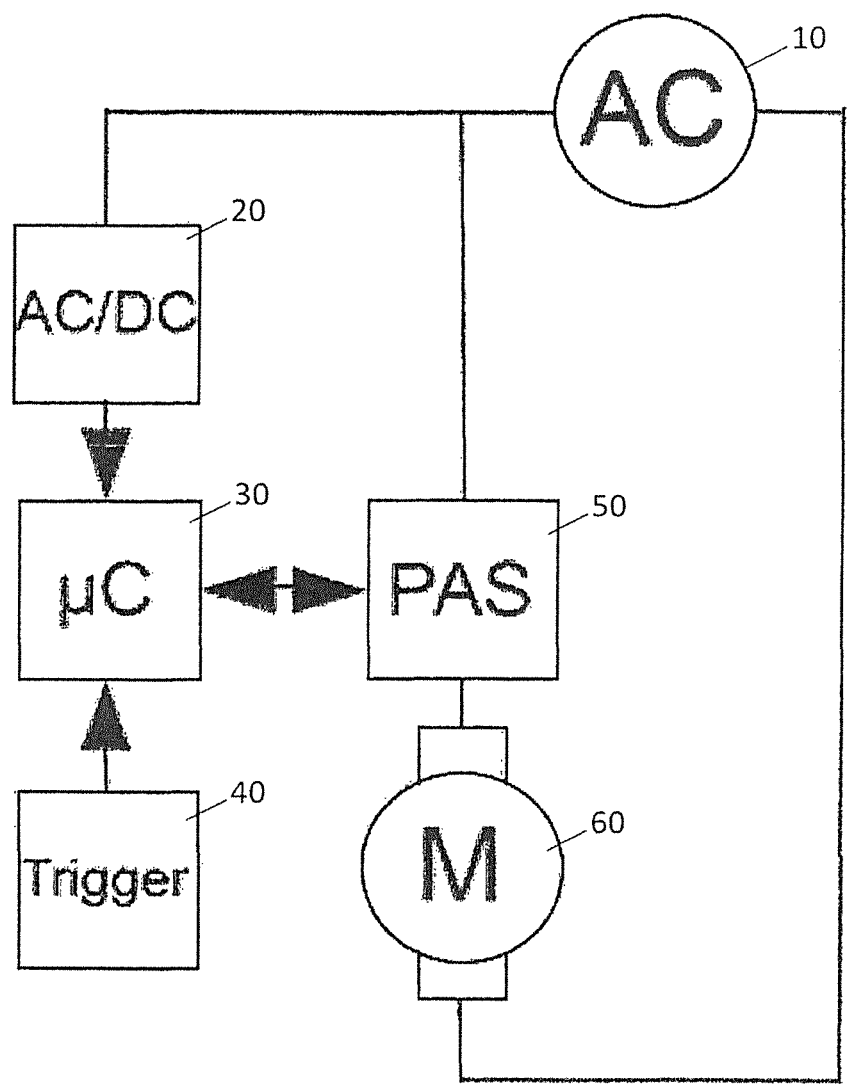
FIG. 4 shows a schematic representation of a controller according to the invention of a drive motor of a product conveyor belt with a phase-start cutting and/or phase-end cutting controller.

FIG. 4 shows a schematic representation of a controller of a drive motor 60 of a product conveyor belt with a phase-start cutting and/or phase-end cutting controller 50. The controller is portrayed simplified. An AC voltage source and/or current source 10 is connected to a rectifier 20 as well as to the phase-start cutting and/or phase-end cutting controller 50. The rectifier 20 converts the alternating current obtained from the current source 10 into direct current and thereby supplies a microcontroller 30. The microcontroller 30 receives a signal from a trigger 40 that for example can be configured as a sensor and/or as a foot pedal. From the trigger 40, both a start signal for starting a product conveyor belt out of a non-driven state as well as a stop signal for stopping the moving product conveyor belt can be sent to the microcontroller 30.

The microcontroller 30 can exchange signals with the phase-start cutting and/or phase-end cutting controller 50. Accordingly, the microcontroller 30 can have a start controller that, after receiving a start signal from the trigger 40, communicates to the phase-start cutting and/or phase-end cutting controller 50 to initially apply the full torque to the drive motor 60 beginning with the phase-end cutting. In so doing, the microcontroller 30 can also control the set time period for which the full torque is applied to the drive motor 60.

The phase-start cutting and/or phase-end cutting controller 50 is connected to the current source 10 whose phase it controls as shown in FIG. 1 such that the phase is cut at the start and/or end of the phase. The phase-start cutting and/or end cutting controller 50 is moreover connected to a drive motor 60, wherein the phase-start cutting and/or phase-end cutting controller 50 controls the torque such that the drive motor 60 is applied to a product conveyor belt at a checkout. The drive motor 60 can for example be configured as a single-phase asynchronous motor with a Steinmetz circuit that is arranged in a checkout system and/or checkout counter system with the produce conveyor belt as the conveyor belt. The use of a drive motor with a Steinmetz circuit has the advantage that special three-phase-current is unnecessary to drive the drive motor; instead, normal alternating current for example from the public power grid is suitable for driving.

The alternating current source 10 can be configured as a typical 230 V/50 Hz AC voltage. The rectifier 20 can be configured as a power supply that converts the AC voltage supplied by the AC source 10 into a DC voltage which is used by the microcontroller 30. The microcontroller 30 can be configured as a module that starts and/or stops the phase-start cutting and/or phase-end cutting controller. The phase-start cutting and/or phase-end cutting controller 50 can have a TRIAC (short for "triode for alternating current") as a switch, a zero crossing module for synchronizing the microcontroller 30 with the alternating voltage, and moreover electrical components for connecting an inductive load to the drive motor 60 in the shown exemplary embodiment.

The trigger 40 signals to the microcontroller to start or stop the process.

Figure 5A:
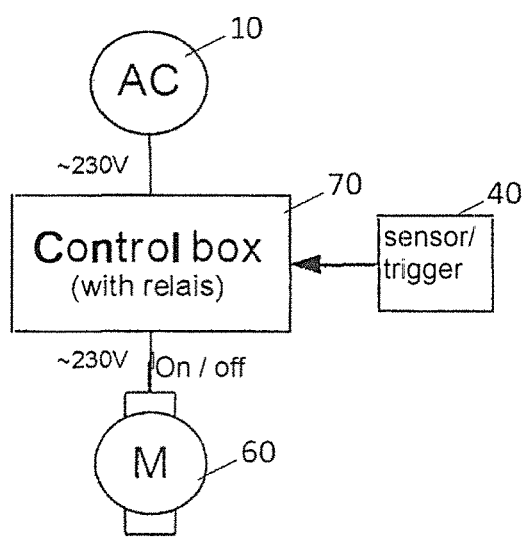
FIG. 5A shows a schematic representation of a conventional controller of a drive motor of a product conveyor belt.

FIG. 5A shows a schematic representation of a conventional controller of a drive motor 60 of a product conveyor belt in a checkout system. The AC voltage source 10 feeds a control box 70 that receives a signal from the trigger 40 to start and stop the processor, i.e., to accelerate and stop a product conveyor belt. The control box 70 can have a phase-start cutting and/or phase-end cutting controller that, as described above, controls the energy and the torque with which the drive motor 60 drives the product conveyor belt.

Figure 5B:
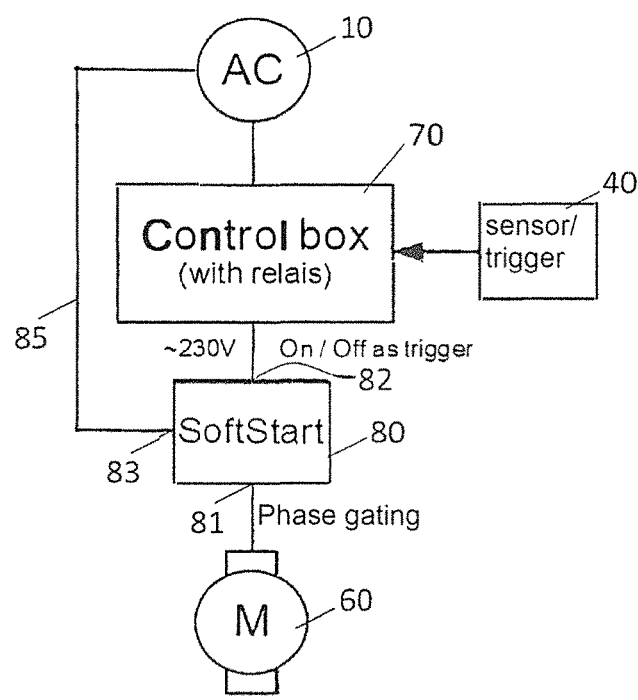
FIG. 5B shows a schematic representation of a controller of a drive motor of a product conveyor belt that is retrofitted with a control unit according to the invention.

FIG. 5B shows a schematic representation of the controller shown in FIG. 5A that has an additional control unit 80. The control unit 80 is connected directly between the control box 70 and drive motor 60. For this, the control unit 80 has an input 82 by means of which it receives the signal from the control box 70 on when the product conveyor belt is to be started and/or stopped. The signal from the control box 70 is used by the control unit 80 only as a trigger signal, even if the control box 70 should have its own phase-start cutting phase-end cutting controller.

The control unit 80 moreover has a motor output 81 by means of which the control unit 80 is connected to the drive motor 60. Via the motor output 81, the control unit 80 can control the amount of current and/or voltage with which to supply the drive motor 60. The torque is thereby controlled that the drive motor 60 applies to the product conveyor belt and with which it drives the product conveyor belt.

The control unit 80 moreover has a power connection 83 by means of which the control unit 80 is connected by a power line 85 directly to the AC voltage source 10. The control unit 80 accordingly has its own additional power connection. In this case, the power line 85 circumvents the control box 70 and can be accordingly configured separately from the control box 70.

The control unit 80 can have its own internal phase-start cutting and/or phase-end cutting controller as well as the above-described start controller with the microcontroller. The control unit 80 can be designed as a separate component with which the checkout system shown in FIG. 5A can be retrofitted.

This provides a way of being able to retrofit checkout systems that are already installed and/or in use so that they can experience the advantages of the controller according to the invention.

This provides an increase in the starting torque of an electric motor when using a phase-start cutting, or respectively phase-end cutting controller. The above-described controller can for example be used for electric motors, asynchronous AC motors, drum motors, belt drives and/or checkout counter systems. In this case, the drive motor is started gently by the controller without initially reducing the torque too strongly.

In one embodiment, the control unit 80 is configured such that it functions even without the control box 70. In this embodiment, the control unit 80 completely replaces the control box 70, wherein it is connected directly between the AC voltage source 10, the trigger 40 and the drive motor 60. In this case, an additional controller can be omitted so that for example any control box 70 that may exist can be removed.

Figure 6:
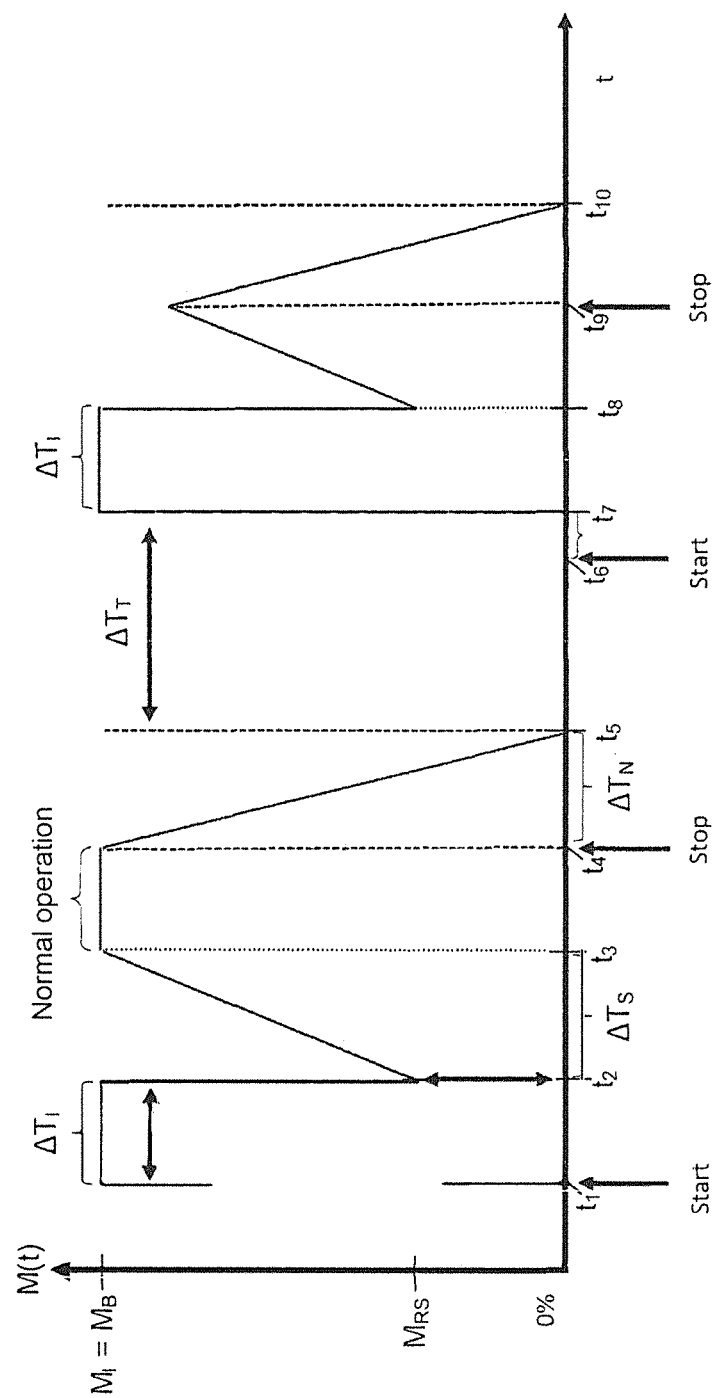
FIG. 6 shows a diagram of the controlled torque according to an exemplary embodiment over several start/stop cycles.

FIG. 6 shows a diagram of the controlled torque M(t) according to an exemplary embodiment over several start/stop cycles. In this context, the time t is plotted on the x-axis, and the controlled torque from 0% to 100% of the maximum torque is plotted on the y-axis. In this case, the controlled torque M(t) shown in FIG. 6 on the y-axis does not precisely have to correspond to the actual torque applied at the respective point in time. More precisely, the phase angle and/or the opening angle of the corresponding motor controller controlled by the control box 70 and/or the control unit 80 is shown in percent on the y-axis in an exemplary embodiment for example of the opening angle of a TRIAC.

If the product conveyor belt as provided according to an exemplary embodiment is operated with at least one asynchronous motor, the controlled phase angle does not necessarily have to correspond to the actually applied torque. Consequently, the diagram shown in FIG. 6 should rather be understood as a schematic sketch in which actually the controlled phase angle is shown on the y-axis that however corresponds to a controlled, desired and/or envisioned torque. The value shown as a percentage can also be termed the controlled torque M(t).

In general, the term "torque" used in the context of this invention can also be understood as "controlled torque", and/or as "controlled phase angle". The same applies similarly to the terms "operating torque", "initial torque", and "ramp start torque" that can also be understood as "controlled operating phase angle", "controlled initial phase angle" and "controlled ramp start phase angle".

The start points in time and stop points in time of the product conveyor belt are alternatingly identified below the time axis.

Sequential points in time are identified with $t_1$ to $t_{10}$.

At the first point in time $t_1$, a start signal is generated to drive the product conveyor belt. For a set duration between the first point in time $t_1$ and the second point in time $t_2$, the product conveyor belt is operated with an initial torque $M_I$. The initial torque $M_I$ corresponds to a non-reduced full torque of 100% of the operating torque $M_B$. The initial torque $M_I$ is applied for an initial time period $\Delta T_I$ (here: $t_2-t_1$) until a certain impetus has been achieved.

At the second point in time $t_2$, the torque is reduced to a ramp starting torque $M_{RS}$ which is about 30% of the full operating torque $M_B$. Then the torque is increased substantially linearly and gradually for a rise time period $\Delta T_S$ until it reaches the full operating torque at the third point in time $t_3$. The increase is carried out using phase-start cutting and/or phase-end cutting and lasts over the rise time period $\Delta T_S$ which in this case is $t_3-t_2$.

From the third point in time $t_3$ to the fourth point in time $t_4$, the full operating torque $M_B$ is applied, and the product conveyor belt is driven normally, for example with a substantially constant TARGET transport speed. At the fourth point in time $t_4$, a stop signal is generated, and the product conveyor belt is braked between the fourth point in time $t_4$ and fifth point in time $t_5$ to 0% of the torque. Braking is essentially linear and gradual using phase-start cutting and/or phase-end cutting. The braking is configured such that it normally occurs over a predetermined time period, i.e., the slope time period $\Delta T_N$ (here: $t_5-t_4$). The slope time period $\Delta T_N$ corresponds to the time period over which the applied torque M(t) is reduced from the operating torque $M_B$ to zero.

Once the applied torque M(t) is reduced to zero, i.e., at the fifth point in time $t_5$ in the shown example, a dead point in time $\Delta T_T$ is started.

At the sixth point in time $t_6$, a new start signal is generated. A check by the control unit shows that less time has passed between the fifth point in time $t_5$ and the sixth point in time $t_6$ than the second dead time of for example 1 s. Consequently, the product conveyor belt is not immediately started; instead, no torque is initially applied up to the seventh point in time $t_7$. At the seventh point in time $t_7$, the dead time has expired (measured from the complete stop of the product conveyor belt to the fifth point in time $t_5$), and a new acceleration cycle is started. In other words, the following applies for the exemplary embodiment: $\Delta T_T = t_7 - t_5$.

For a set duration between the seventh point in time $t_7$ and the eighth point in time $t_8$, the product conveyor belt is again driven with the initial torque $M_I$ of 100% of the operating torque $M_B$ until a certain impetus has been achieved once again for the set initial time period $\Delta T_I$.

At the eighth point in time $t_8$, the applied torque is reduced to the ramp starting torque $M_{RS}$ which is about 30% of the full operating torque $M_B$. Then the applied torque M(t) is increased substantially linearly and gradually up to a ninth point in time $t_9$ until a stop signal is generated before 100% of the operating torque $M_B$ is reached.

Then the product conveyor belt is braked between the ninth point in time $t_9$ and the tenth point in time $t_{10}$ to 0% of the torque.

In an exemplary embodiment, at least one of the following parameters of the control box 70 and/or the control unit 80 can be set:
- the length of the initial time period $\Delta T_I$, i.e., the time period of driving with full initial torque $M_I$ when starting the product conveyor belt;
- the length of the dead time $\Delta T_R$, i.e., the time period before the renewed beginning of the acceleration after braking the product conveyor belt; and/or
- the size of the ramp starting torque $M_{RS}$, i.e., the starting point for the acceleration ramp.

Preferably, all three of these parameters can be adjusted in order to adapt the control box 70 and/or the control unit 80 to the special conditions of the checkout system.

REFERENCE NUMBER LIST

10 Alternating current source
20 Rectifier
30 Microcontroller
40 Trigger
50 Phase-start cutting and/or phase-end cutting controller
60 Drive motor
70 Control box
80 Control unit
81 Motor output
82 Input
83 Power connection
85 Power supply line
M(t) Applied torque
$M_B$ Operating torque
$M_I$ Initial torque
$M_{RS}$ Ramp starting torque
S Current characteristic
$\Delta T_I$ Initial time period
$\Delta T_N$ Slope time period
$\Delta T_S$ Rise time period
$\Delta T_T$ Dead time
P Characteristic of the percentage of power
$t_1 \ldots t_{10}$ first to tenth point in time
$t_v$ Point in time at which the full load current is reached
φ Start phase angle

The invention claimed is:

1. A controller for a drive motor (60) of a product conveyor belt at a checkout comprising:
   a phase-start cutting and/or phase-end cutting controller (50) that controls the drive motor (60) such that the product conveyor belt is driven with a reduced torque starting from a non-driven state, and
   a start controller that controls the drive motor (60) in such a manner that the drive motor (60) initially drives with a non-reduced torque when accelerating the product conveyor belt from the non-driven state before the phase-start cutting and/or phase-end cutting controller (50) further accelerates the product conveyor belt with reduced torque.

2. The controller of claim 1, wherein the start controller is configured such that the drive motor (60) drives the product conveyor belt with non-reduced torque for a set time period before the phase-start cutting and/or phase-end cutting controller (50) further accelerates the product conveyor belt with reduced torque.

3. The controller of claim 1, wherein the start controller is configured such that the product conveyor belt is driven with the non-reduced torque until a full load current is reached when driving the product conveyor belt.

4. The controller claim 1, wherein the phase-start cutting and/or phase-end cutting controller (50) increases the torque of the drive motor substantially continuously and/or linearly up to the full torque when accelerating the product conveyor belt.

5. The controller of claim 1, wherein the phase-start cutting and/or phase-end cutting controller (50) increases the drive motor torque beginning at a predetermined ramp starting torque (MRS) that corresponds to about 10% to about 50% of an operating torque (MB) up to the full operating torque (MB) when accelerating the product conveyor belt.

6. The controller of claim 1, wherein the start controller is configured such that after a stoppage of the product conveyor belt, a dead time (ΔTT) of a predetermined duration is provided, after the expiration of which the product conveyor belt is re-accelerated as soon as possible.

7. The control of claim 1, wherein the phase-start cutting and/or phase-end cutting controller (50) continues to control the drive motor (60) such that the product conveyor belt is braked from a driven state with an initially reduced torque before the drive motor (60) stops driving the product conveyor belt.

8. The controller of claim 1, with a trigger (40) for initiating the acceleration of the product conveyor belt from the non-driven state, and/or for initiating a stoppage of the product conveyor belt from a driven state.

9. A control unit (80) for a checkout system that has:
a product conveyor belt,
a drive motor (60), and
a phase-start cutting and/or phase-end cutting controller (50) that controls the drive motor (60) such that the product conveyor belt is driven with a reduced torque starting from a non-driven state, the control unit (80) comprising: a start controller that controls the drive motor (60) in such a manner that the drive motor (60) initially drives with a non-reduced torque when accelerating the product conveyor belt from the non-driven state before the phase-start cutting and/or phase-end cutting controller (50) further accelerates the product conveyor belt with the reduced torque, wherein the control unit (80) is configured as a separate component that has the start controller and is connected between the phase-start cutting and/or phase-end cutting controller (50) on the one hand in the drive motor (60) on the other hand.

10. The control unit (80) of claim 9, with its own power connection (83) that is configured separately from a power connection for the phase-start cutting and/or phase-end cutting controller (50).

11. The control unit (80) of claim 9 with its own internal phase-start cutting and/or phase-end cutting controller that further accelerates the product conveyor belt with reduced torque instead of the phase-start cutting and/or phase-end cutting controller (50) of the checkout system after the start controller drives the product conveyor belt with initially non-reduced torque when accelerating the product conveyor belt from the non-driven state.

12. A control unit (80) for a checkout system that has:
a product conveyor belt,
a drive motor (60) and
a trigger (40) for initiating the acceleration of the product conveyor belt from the non-driven state, and/or for initiating a stoppage of the product conveyor belt from a driven state;
comprising: a phase-start cutting and/or phase-end cutting controller (50) that controls the drive motor (60) such that the product conveyor belt is driven with a reduced torque starting from a non-driven state, and a start controller that controls the drive motor (60) in such a manner that the drive motor (60) initially drives with a non-reduced torque when accelerating the product conveyor belt from the non-driven state before the phase-start cutting and/or phase and cutting controller (50) further accelerates the product conveyor belt with reduced torque, wherein the control unit (80) is configured as a separate component that has the start controller and the phase-start cutting and/or phase-end cutting controller as an internal component, and is connected between the trigger (40) and the drive motor (60).

13. The control unit (80) of claim 9, wherein the control unit (80) is connected to a plurality of drive motors (60) of different product conveyor belts and is configured to control this plurality of drive motors (60) with the at least one starting controller.

14. The control unit (80) of claim 9 further comprising an interface for:
undertaking software updates for the control unit (80);
for reading out parameters and/or data from the control unit (80); and/or
for establishing a connection to a module of the checkout system.

15. The control unit (80) of claim 9 with a thermal switch for overload protection of the drive motor (60).

16. The control unit (80) of claim 9 further comprising a memory module for saving data from the control unit.

17. The control unit (80) of claim 16, further comprising:
a forecasting module that is configured to derive and/or estimate a forecast characteristic value for a residual life of the drive motor (60) from the saved data of the control unit,
and/or
a usage profile module which is configured to derive and/or estimate a usage profile relating to the utilization of the checkout system from the saved data.

18. A checkout system comprising: a product conveyor belt, a drive motor (60) and the controller of claim 1.

19. A checkout system comprising: a product conveyor belt, a drive motor (60), a phase-start cutting and/or phase-end cutting controller (50) that controls the drive motor (60) such that the product conveyor belt is driven with a reduced torque starting from a non-driven state, and further comprising the control unit (80) of claim 9.

20. A method for controlling a drive motor (60) of a product conveyor belt at a checkout, wherein when accelerating the product conveyor belt from a non-driven state, initially, the method comprising:
controlling the drive motor (60) such that the drive motor (60) drives the product conveyor belt with non-reduced torque before controlling a phase-start cutting and/or phase-end cutting controller (50) to control the drive motor (60) such that the product conveyor belt is accelerated further with a reduced torque.

\* \* \* \* \*